(12) United States Patent
Weng

(10) Patent No.: US 11,076,077 B2
(45) Date of Patent: Jul. 27, 2021

(54) FILTER SWITCH DEVICE

(71) Applicant: FUNDER ELECTRONIC GLOBAL CO., LTD., Taipei (TW)

(72) Inventor: Wai-How Weng, Taipei (TW)

(73) Assignee: FUNDER ELECTRONIC GLOBAL CO., LTD., Taipei (TW)

( * ) Notice: Subject to any disclaimer, the term of this patent is extended or adjusted under 35 U.S.C. 154(b) by 17 days.

(21) Appl. No.: 16/780,908

(22) Filed: Feb. 4, 2020

(65) Prior Publication Data

US 2020/0220999 A1    Jul. 9, 2020

Related U.S. Application Data

(63) Continuation-in-part of application No. 16/243,053, filed on Jan. 8, 2019, now abandoned.

(30) Foreign Application Priority Data

Sep. 11, 2019   (TW) .................................. 108212095

(51) Int. Cl.
| | |
|---|---|
| *H04N 5/225* | (2006.01) |
| *H04N 5/232* | (2006.01) |
| *G02B 5/20* | (2006.01) |
| *G03B 17/12* | (2021.01) |

(52) U.S. Cl.
CPC ............ *H04N 5/2254* (2013.01); *G02B 5/20* (2013.01); *G03B 17/12* (2013.01); *H04N 5/232* (2013.01)

(58) Field of Classification Search
CPC ................................ G02B 5/20; H04N 5/2254
See application file for complete search history.

(56) References Cited

U.S. PATENT DOCUMENTS

| | | | | |
|---|---|---|---|---|
| 2005/0073604 A1* | 4/2005 | Umezu | ................ | H04N 5/2254 348/363 |
| 2007/0291157 A1* | 12/2007 | Ding | ..................... | H04N 5/232 348/360 |
| 2018/0356283 A1* | 12/2018 | Shikama | ................... | G01J 5/62 |
| 2020/0007730 A1* | 1/2020 | Doi | .......................... | G03B 9/02 |

\* cited by examiner

*Primary Examiner* — Clayton E. LaBalle
*Assistant Examiner* — Dennis Hancock
(74) *Attorney, Agent, or Firm* — Leong C. Lei

(57) ABSTRACT

The filter switch device includes a casing, an electromagnetic assembly, and a plate. The casing has a first chamber and a second chamber inside. The second chamber has a first opening on a bottom side. The electromagnetic assembly is housed in the first chamber. A bottom side of the first chamber is configured with an axle, first blocks, second blocks, and a pad for fixing the electromagnetic assembly. The plate has its two opposing edges respectively received by troughs of the second chamber, where a filter is disposed on the plate. A piece is extended from a lateral edge of the plate and has a limiting hole. A swing arm of the electromagnetic element engages the plate through the limiting hole. When the swing arm turns, the plate is moved so that the filter is aligned with the first opening, thereby achieving filter switch.

10 Claims, 5 Drawing Sheets

US 11,076,077 B2

FILTER SWITCH DEVICE

CROSS REFERENCE TO RELATED APPLICATIONS

This is a continuation-in-part application of co-pending U.S. patent application Ser. No. 16/243,053, "Lens Screening Device", filed on Jan. 8, 2019.

BACKGROUND OF THE INVENTION

(a) Technical Field of the Invention

The present invention is generally related to optical devices, and more particular to a filter switch device.

(b) Description of the Prior Art

A filter switch device is usually included in a camera assembly and is placed between the image sensor and the lens. The filter switch device, such as an infrared-cut filter removable (ICR) device, allows a filter to be placed or removed from the front of the sensor by motor or electromagnet mechanism, depending on the illumination condition.

Currently, the production efficiency of conventional filter switch devices cannot be enhanced as their manufacture is not fully automated.

SUMMARY OF THE INVENTION

To obviate the shortcomings of the prior art, that present invention teaches a filter switch device including a casing comprising a first chamber and a second chamber inside, where the first chamber and the second chamber are connected, the first chamber has a greater depth than that of the second chamber, a bottom side of the first chamber is configured with an axle, a plurality of first blocks, second blocks, and a pad, the first chamber has a left notch and a right notch respectively along two opposing inner walls of the first chamber, and the second chamber has a first opening on a bottom side and two troughs respectively along two opposing inner walls of the second chamber; an electromagnetic assembly housed in the first chamber comprises a magnetic element, a swing arm, an iron core, a winding seat accommodating the iron core, and a plurality of windings on the winding seat, where the axle threads through the magnetic element, a back end of the swing arm is mounted to a top end of the axle and coupled to the magnetic element, a front end of the swing arm has an engaging element, the iron core has a U-like shape with two parallel and opposing arms, the windings seat comprises two tubes, and the two arms of the iron core respectively thread through the tubes, the magnetic element is held between the two arms of the iron core, which are in turn are fixed by the first blocks, a body of the iron core is disposed on the pad and fixed by the second blocks, the magnetic element's two sides are respective a positive side and a negative side, the windings are respectively connected to a first welding pin and a second welding pin, the first welding pin and the second welding pin are connected to a plug, the plug is electrically connected to an external power source, an electromagnetic field produced by the windings after electricity is introduced is expelled by the positive side and the negative side of the magnetic element so that the magnetic element is turned as well as the swing arm; and a plate has its two opposing edges respectively received by the troughs of the second chamber, where a filter is disposed on the plate, a piece is extended from a lateral edge of the plate, the piece is located above the right notch, the piece has a limiting hole, the swing arm's engaging element runs through the limiting hole, and, when the swing arm turns, the engaging element drives the plate to move so that the filter is aligned with the first opening.

The iron core's two arms respectively have a concaved section facing each other, and the concaved sections respectively face the magnetic element's positive side and negative side.

The casing further includes a cover sealing the first chamber and the second chamber, and the cover has second opening corresponding to the first opening.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
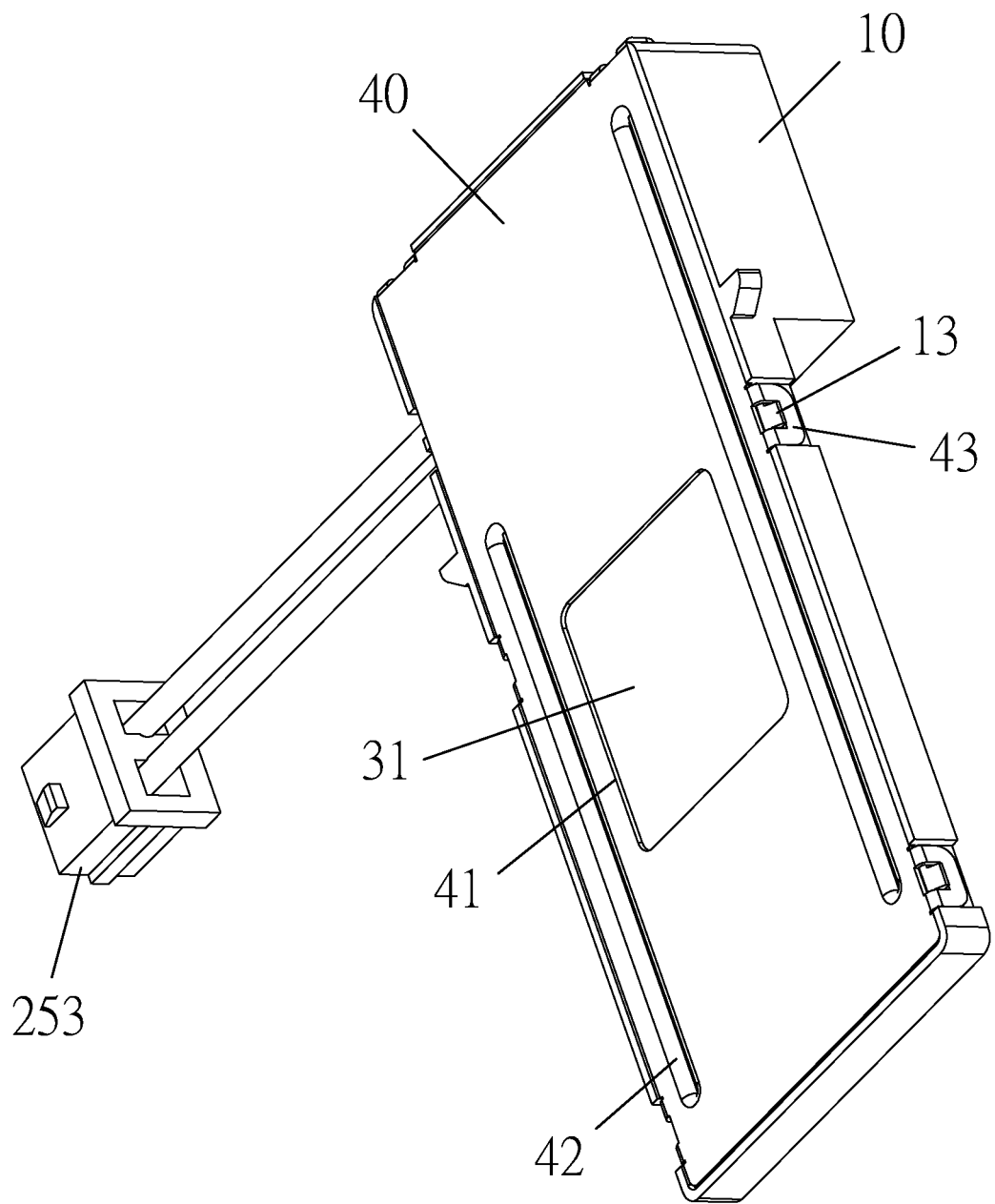
FIG. 1 is a perspective diagram showing a filter switch device according to an embodiment of the present invention.
Figure 2:
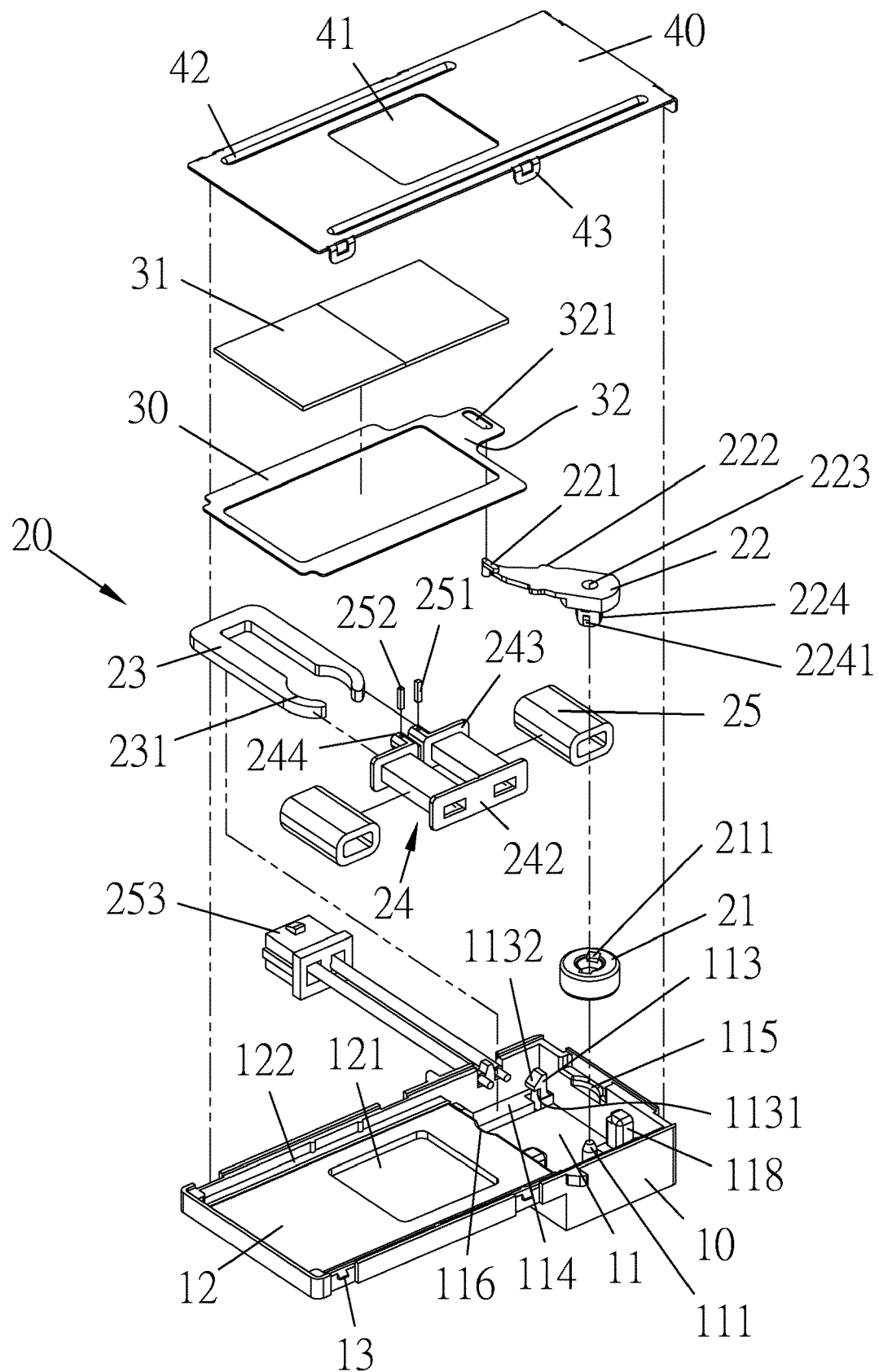
FIG. 2 is a perspective break-down diagram showing the filter switch device of FIG. 1.
Figure 3:
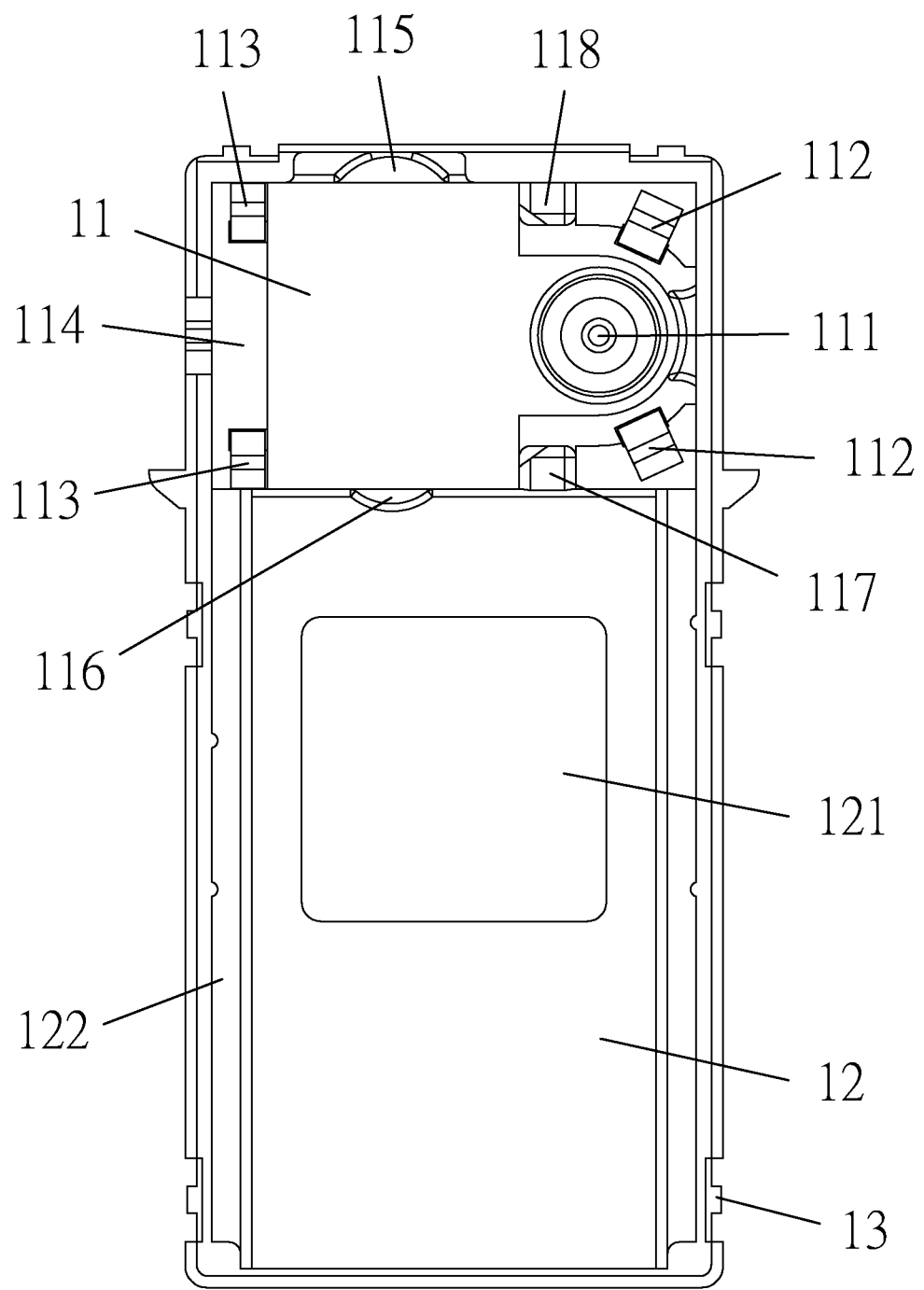
FIG. 3 is a top-view diagram showing the filter switch device of FIG. 1.
Figure 4:
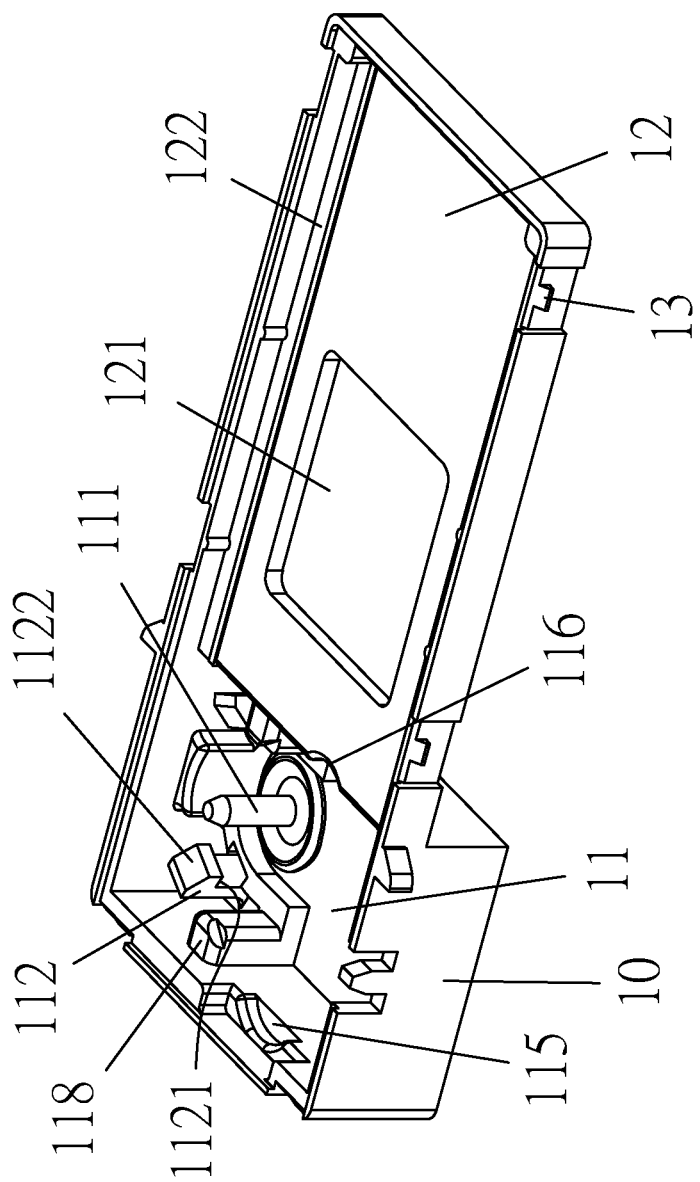
FIG. 4 is another perspective diagram showing the filter switch device of FIG. 1.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 4, a filter switch device according to an embodiment of the present invention includes the following components.

A casing 10 provides a first chamber 11 and a second chamber 12 inside. The first chamber 11 and the second chamber 12 are connected, and the first chamber 11 has a greater depth than that of the second chamber 12. A bottom side of the first chamber 11 is configured with an axle 111, a number of first blocks 112, a number of second blocks 113, and a pad 114. The first chamber 11 has a left notch 115 and a right notch 116 respectively along two opposing inner walls of the first chamber 11. The first chamber 11 further has a first cushion element 117 and a second cushion element 118 inside. The second chamber 12 has a first opening 121 on a bottom side and two troughs 122 respectively along two opposing inner walls of the second chamber 12.

As shown in FIGS. 2 to 5, an electromagnetic assembly 20 includes a magnetic element 21, a swing arm 22, an iron core 23, a winding seat 24 accommodating the iron core 23, and a number of windings 25 on the winding seat 24. The iron core 23, winding seat 24, and windings 25 are modularized structures.

The axle 111 threads through the magnetic element 21. A back end of the swing arm 22 is mounted to a top end of the axle 111 and coupled to the magnetic element 21. A front end of the swing arm 22 has an engaging element 221. The swing arm 22 has two slant sides from the front end to the back end, each configured with an outward protruding bulge 222. In the present embodiment, the magnetic element 21 is ring-shaped whose inner wall is configured with a number of locking recesses 211 at intervals. The back end of the swing arm 22 has an opening 223. The swing arm 22 has a column 224 extended downward from a bottom side opposite to the opening 22. A number of locking elements 2241 are configured at intervals around the column 224 for engaging the locking recesses 211. The engagement between the locking elements 2241 and the locking recesses 211 provides a convenient locking better than adhesive.

The iron core 23 has a U-like shape with two parallel and opposing arms. The windings seat 24 includes two tubes 241, and the two arms of the iron core 23 respectively thread through the tubes 241. The windings 25 are respectively wound around the tubes 241. The tubes 241 have a first end joined to a first flange 242, and each tube 241 has a second end joined to a respective second flange 243. The windings 25 are thereby confined between the first flange 242 and the second flanges 243. A positioning block 244 is extended from each second flange 243 opposite to the tubes 241.

The iron core 23 is housed in the first chamber 11. The magnetic element 21 is held between the two arms of the iron core 23, which are in turn are fixed by the first blocks 112. A body of the iron core 23 is disposed on the pad 114 and fixed by the second blocks 113. Each first block 112 and second block 113 respectively has a first hook 1121 and a second hook 1131 for fixing the iron core 23. The first blocks 112 and the second blocks 113 respectively have slant first guiding slopes 1122 and second guiding slopes 1132. With the first guiding slopes 1122 and second guiding slopes 1132, the iron core 23 may be embedded inside the first chamber 11, and fixed by the first blocks 112 and the second blocks 113. The circumference of the winding seat 24 contacts with the inner wall of the first chamber 11, the first cushion element 117, the second cushion element 118, and the second block 113. The positioning blocks 244 also contact with the inner wall of the first chamber 11. As such, the installation of the iron core 23 may be conducted in an automated manufacturing process for enhanced performance.

The magnetic element 21's two sides are respective a positive side and a negative side. The iron core 23's two arms respectively have a concaved section 231 facing each other. The concaved sections 231 respectively face the magnetic element 21's positive side and negative side. A first welding pin 251 and a second welding pin 252 are respectively configured on the positioning blocks 244.

The windings 25 are respectively connected to the first welding pin 251 and the second welding pin 252. The first welding pin 251 and the second welding pin 252 are connected to a plug 253. The plug 253 is electrically connected to an external power source.

The windings seat 24 has a modular design. The windings 25 are mounted on the windings seat 24, and the two arms of the iron core 23 are plugged into the winding seat 24 so as to produce electromagnetic force. The windings 25 are respectively connected to the first welding pin 251 and the second welding pin 252, which in turn are connected to the plug 253.

A plate 30 has its two opposing edges respectively received by the troughs 122 of the second chamber 12. A filter 31 is disposed on the plate 30. A piece 32 is extended from a lateral edge of the plate 30. The piece 32 is located above the right notch 116, and the piece 32 has a limiting hole 321. The swing arm 22's engaging element 221 runs through the limiting hole 321.

The casing 10 further includes a cover 40 sealing the first chamber 11 and the second chamber 12. The cover 40 has second opening 41 corresponding to the first opening 121.

The cover 40 has a number of protruding positioning elements 42 arranged in parallel on a bottom side to two opposing sides of the second opening 41. The plate 30 is positioned between the positioning elements 42.

A number of first fasteners 43 are arranged at intervals around the cover 40's circumference. A number of second fasteners 13 are arrange at intervals along a circumferential wall of the casing 10. Each first fastener 43 is coupled to a corresponding second fastener 13 so as to withstand external impact.

Figure 5:
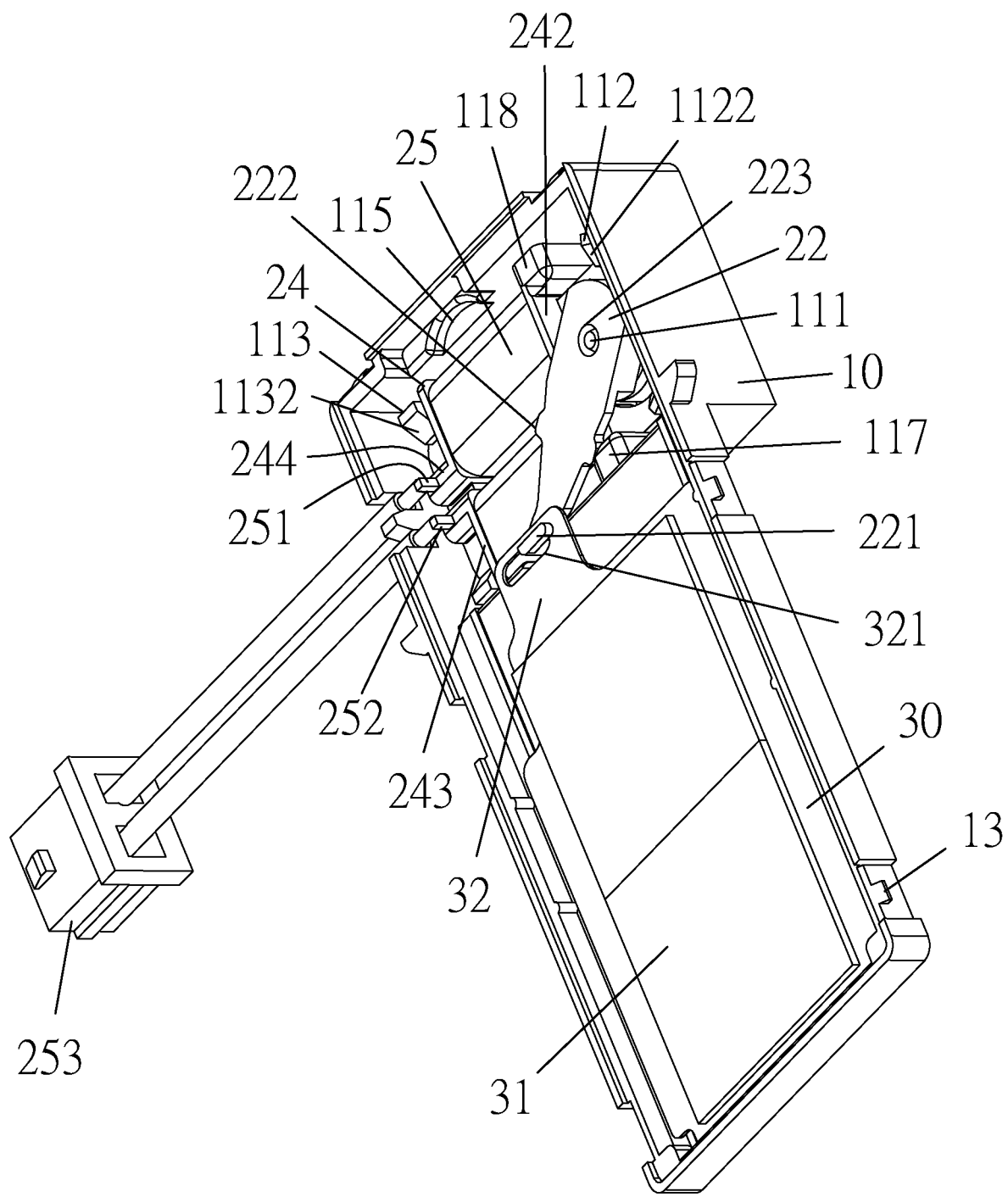
FIG. 5 is another perspective diagram showing interior of the filter switch device of FIG. 1.

As shown in FIG. 5, the filter switch device of the present embodiment, the electromagnetic field produced by the windings 25 after electricity is introduced is expelled by the magnetism from the positive side and the negative side of the magnetic element 21. The magnetic element 21 is turned as well as the swing arm 22. When the swing arm 22 turns, the engaging element 221 moves the plate 30, and the filter 31 and the first opening 121 are aligned, thereby achieving the filter switch. When the swing arm 22 is not turned, a bulge 222 is against the first cushion element 117 and, when the swing arm 22 is turned, another bulge 222 is against the second cushion element 118. An operation life of the switch arm 22 is extended as its impact is buffered by the second cushion element 118. The filter switch device has a reduced form factor and weight, and therefore it may be employed in various applications.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A filter switch device, comprising:
   a casing comprising a first chamber and a second chamber inside, where the first chamber and the second chamber are connected, the first chamber has a greater depth than that of the second chamber, a bottom side of the first chamber is configured with an axle, a plurality of first blocks, second blocks, and a pad, the first chamber has a left notch and a right notch respectively along two opposing inner walls of the first chamber, and the second chamber has a first opening on a bottom side and two troughs respectively along two opposing inner walls of the second chamber;
   an electromagnetic assembly housed in the first chamber comprises a magnetic element, a swing arm, an iron core, a winding seat accommodating the iron core, and a plurality of windings on the winding seat, where the axle threads through the magnetic element, a back end of the swing arm is mounted to a top end of the axle and coupled to the magnetic element, a front end of the swing arm has an engaging element, the iron core has a U-like shape with two parallel and opposing arms, the windings seat comprises two tubes, and the two arms of the iron core respectively thread through the tubes, the magnetic element is held between the two arms of the iron core, which are in turn are fixed by the first blocks, a body of the iron core is disposed on the pad and fixed by the second blocks, the magnetic element's two sides are respective a positive side and a negative side, the windings are respectively connected to a first welding pin and a second welding pin, the first welding pin and the second welding pin are connected to a plug, the plug is electrically connected to an external power source, an electromagnetic field produced by the windings after electricity is introduced is expelled by the positive side and the negative side of the magnetic element so that the magnetic element is turned as well as the swing arm; and a plate has its two opposing edges respectively received by the troughs of the second chamber, where a filter is disposed on the plate, a piece is extended from a lateral edge of the plate, the piece is located above the right notch, the piece has a limiting hole, the swing arm's engaging element runs through the limiting hole, and, when the swing arm turns, the engaging element drives the plate to move so that the filter is aligned with the first opening.

2. The filter switch device according to claim 1, wherein the iron core's two arms respectively have a concaved section facing each other; and the concaved sections respectively face the magnetic element's positive side and negative side.

3. The filter switch device according to claim 1, wherein the casing further comprises a cover sealing the first chamber and the second chamber; and the cover has second opening corresponding to the first opening.

4. The filter switch device according to claim 3, wherein the cover has a plurality of protruding positioning elements arranged in parallel on a bottom side to two opposing sides of the second opening; and the plate is positioned between the positioning elements.

5. The filter switch device according to claim 4, wherein a plurality of first fasteners are arranged at intervals around the cover's circumference; a plurality of second fasteners are arrange at intervals along a circumferential wall of the casing; and each first fastener is coupled to a corresponding second fastener.

6. The filter switch device according to claim 1, wherein the swing arm has two slant sides from the front end to the back end, each configured with an outward protruding bulge; the first chamber further has a first cushion element and a second cushion element inside; when the swing arm is not turned, a bulge is against the first cushion element; and, when the swing arm is turned, another bulge is against the second cushion element.

7. The filter switch device according to claim 1, wherein each first block and second block respectively has a first hook and a second hook for fixing the iron core.

8. The filter switch device according to claim 7, wherein the first blocks and the second blocks respectively have slant first guiding slopes and second guiding slopes; and, with the first guiding slopes and second guiding slopes, the iron core is disposed and embedded inside the first chamber, and fixed by the first blocks and the second blocks.

9. The filter switch device according to claim 1, wherein the magnetic element is ring-shaped whose inner wall is configured with a plurality of locking recesses at intervals; the back end of the swing arm has an opening; the swing arm has a column extended downward from a bottom side opposite to the opening; a plurality of locking elements are configured at intervals around the column for engaging the locking recesses.

10. The filter switch device according to claim 1, wherein the windings seat comprises two tubes, the two arms of the iron core respectively thread through the tubes; the windings are respectively wound around the tubes; the tubes have a first end joined to a first flange; each tube has a second end joined to a respective second flange; the windings are thereby confined between the first flange and the second flanges; a positioning block is extended from each second flange opposite to the tubes; the positioning blocks contact with an inner wall of the first chamber; and the first welding pin and the second welding pin are respectively configured on the positioning blocks.

\* \* \* \* \*